United States Patent [19]
Giovanni

[11] Patent Number: 5,823,334
[45] Date of Patent: Oct. 20, 1998

[54] COMPACT DISC HIGH FRICTION BOTTOM COASTER

[76] Inventor: Chandra D. Giovanni, P.O. Box 3225, Saratoga, Calif. 95070

[21] Appl. No.: 689,697

[22] Filed: Aug. 16, 1996

[51] Int. Cl.$^6$ .............................. B65D 85/57; B65D 25/24
[52] U.S. Cl. ........................ 206/308.1; 206/309; 220/632
[58] Field of Search ................................ 206/308.1, 307, 206/309, 310, 312, 313, 303, 308.2; 220/632

[56] References Cited

U.S. PATENT DOCUMENTS

| | | |
|---|---|---|
| 4,762,225 | 8/1988 | Henkel . |
| 4,971,195 | 11/1990 | Mitsuyama . |
| 5,016,749 | 5/1991 | Kaye et al. ............................... 206/5.1 |
| 5,048,681 | 9/1991 | Henkel . |
| 5,186,327 | 2/1993 | McCafferty et al. . |
| 5,299,186 | 3/1994 | Tsurushima . |
| 5,340,075 | 8/1994 | Schriner . |

*Primary Examiner*—Bryon P. Gehman
*Attorney, Agent, or Firm*—James D. Ivey

[57] ABSTRACT

A compact disc coaster includes a soft, substantially non-scratching material on an upper surface which is adapted to receive a compact disc. Specifically, the compact disc coaster is adapted to receive a compact disc by including a recess which is substantially the size and shape of a compact disc. A user places a compact disc in the compact disc coaster by simply dropping the compact disc into the recess. Since the compact disc is not slid into position, the underside of the compact disc is not slid along any material for any appreciable distance. Accordingly, dirt or particles in the recess of the compact disc coaster do not scratch the underside of the compact disc and therefore do no cause data errors in the compact disc. The compact disc coaster includes a relatively high-friction bottom surface which prevents slippage of the compact disc coaster from a relatively flat surface on which the compact disc coaster is placed. As a result, the compact disc coaster remains securely in place and does not slip to spill the compact disc onto the floor or other objects where the compact disc can be damaged.

1 Claim, 4 Drawing Sheets

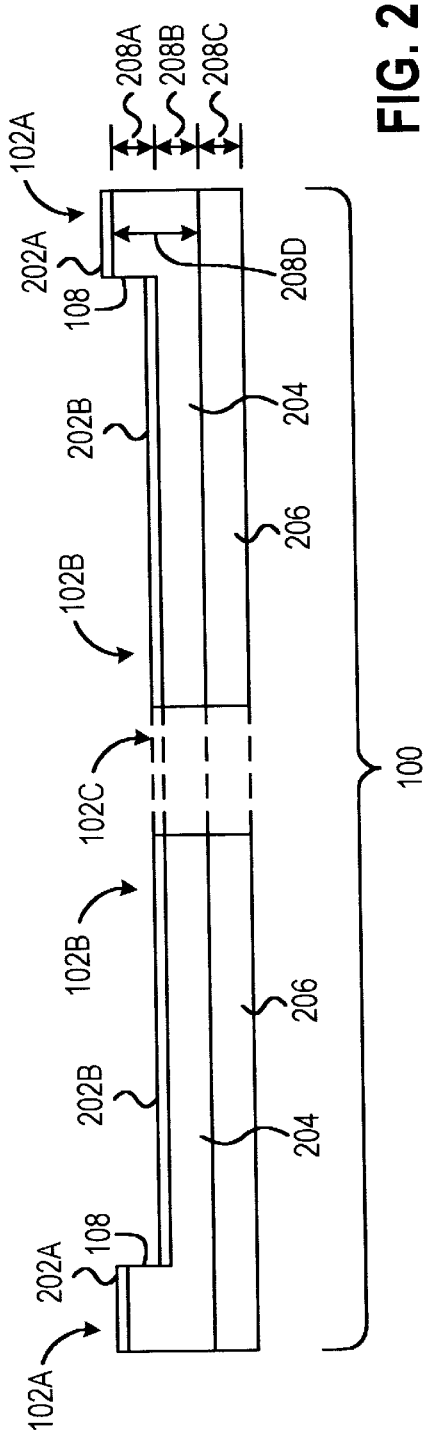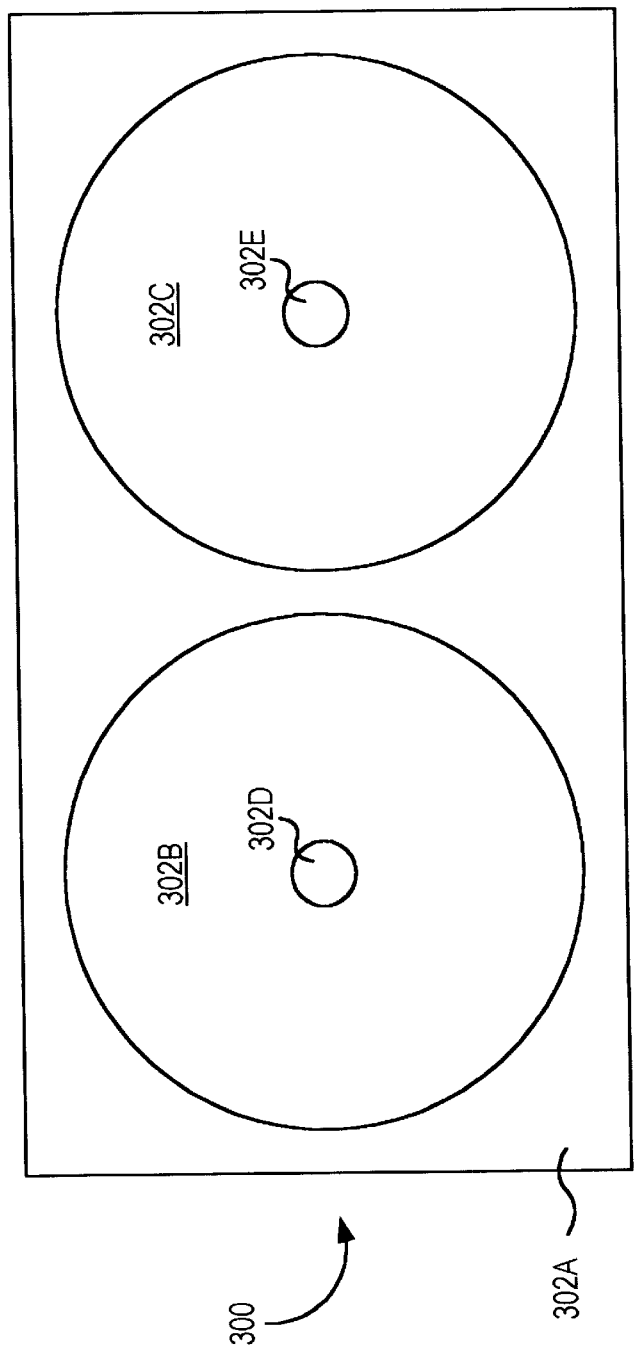

COMPACT DISC HIGH FRICTION BOTTOM COASTER

FIELD OF THE INVENTION

The present invention relates to articles for storing recorded media and, in particular, to an article for storing compact discs.

BACKGROUND OF THE INVENTION

Over the past decade, compact discs have grown in popularity to such an extent that compact discs are now the standard for audio recording media. In addition, compact discs are becoming the standard for computer data and software distribution. Compact discs have the advantageous ability to store considerable amounts of digital data. However, compact discs can be subject to data errors and loss of data if the underside of the compact disc is scratched or damaged.

Compact discs generally have a reflective layer which is protected by a translucent layer and in which data is encoded. A laser beam typically penetrates the translucent layer, typically through the underside of the compact disc, and deflects from the reflective layer. Variations in the reflective layer deflect the laser beam in slightly different directions to represent specific data recorded in the reflective layer. Even relatively small defects in the translucent layer can deflect the laser beam sufficiently that data is misinterpreted, thereby causing data errors and accordingly loss of data.

Therefore, care must generally be taken to avoid damage to the underside of a compact disc and thereby to avoid introducing defects to the translucent layer of the compact disc. Compact discs are currently sold in what are commonly known as "Gem" boxes which include a lid and which hold a compact disc in place by spring tension applied to the center hole of the compact disc. By applying spring tension to the center hole of the compact disc, a gem box holds the compact disc in place while avoiding physical contact with the underside of the compact disc.

Gem boxes are designed for long-term storage of compact discs but are inconvenient for short-term storage of compact discs. Specifically, a user must generally use both hands to place a compact disc into, or remove a compact disc from, a gem box. Many electronic databases are now available on compact disc and are accessed through a personal computer. In researching a particular topic, a user may insert a compact disc, search a database for information, and remove the compact disc to insert another compact disc to search another database. In other words, a user may quickly swap one compact disc for another in a compact disc drive of a computer relatively frequently. Accordingly, convenience of compact disc storage has become an important consideration. Using two hands to place a compact disc into a gem box or to remove a compact disc from a gem box, and using two hands to open a gem box, is insufficiently convenient for a user who is eagerly and quickly searching a digital library of resources stored on compact discs, especially if the user removes a compact disc from the computer system and the user anticipates re-loading the compact disc into the computer system relatively soon thereafter.

Compact disc portfolios are also available. Such portfolios typically include a number of plastic envelopes which are generally bound together to resemble a book of compact disc envelopes and each of which is designed to hold a single compact disc. Each envelope further includes an inside surface which is designed to be in physical contact with the underside of a compact disc but to avoid scratching the underside of the compact disc. Removing a compact disc from such an envelope is difficult to do without touching the underside of the compact disc. Fingerprints and smudges which result from touching the underside of the compact disc can deflect a laser beam and can result in data errors. In addition, since the underside of the compact disc is slid along the inside surface of the compact disc envelope, dirt or other particles inside the compact disc envelope can scratch the underside of the compact disc during insertion or removal of the compact and can therefore introduce data errors.

In addition, compact disc portfolios are not particularly convenient for quick, short term storage of compact discs. Many such portfolios are zipped closed with a zipper. Accordingly, two hands are typically required to open such a portfolio. In addition, slipping a compact disc into a compact disc envelope requires care and dexterity to lift the edge of the envelope to allow for insertion of the compact disc into the envelope.

As a result, many users of compact discs frequently resort to laying a compact disc on any available relatively flat surface with the underside of the compact disc facing up to avoid contact between the underside and the flat surface. Compact discs are therefore often precariously placed and other objects may get placed on top of the underside of the compact discs. Accordingly, a need persists in the industry for a particularly convenient short-term storage device for compact discs.

SUMMARY OF THE INVENTION

In accordance with the present invention, a compact disc coaster includes a soft, substantially non-scratching material on an upper surface which is adapted to receive a compact disc. Specifically, the compact disc coaster is adapted to receive a compact disc by including a recess which is substantially the size and shape of a compact disc. A user places a compact disc in the compact disc coaster by simply dropping the compact disc into the recess. Since the compact disc is not slid into position, the underside of the compact disc is not slid along any material for any appreciable distance. Accordingly, dirt or particles in the recess of the compact disc coaster do not scratch the underside of the compact disc and therefore do no cause data errors in the compact disc. However, the surface of the outer edge of the compact disc coaster is made of a substantially non-scratching material such that inadvertent contact between the compact disc and the compact disc coaster during insertion of the compact disc into the recess does not scratch the underside of the compact disc.

Further in accordance with the present invention, the compact disc coaster includes a relatively high-friction bottom surface which prevents slippage of the compact disc coaster from a relatively flat surface on which the compact disc coaster is placed. As a result, the compact disc coaster remains securely in place and does not slip to spill the compact disc onto the floor or other objects where the compact disc can be damaged. In addition, the recess into which the compact disc is placed has a depth which is greater than the thickness of the compact disc such that a compact disc coaster can be stacked on top of a second compact disc coaster while the second compact disc coaster simultaneously holds in its recess a compact disc.

The compact disc coaster according to the present invention is relatively simple in design and relatively inexpensive to manufacture. Yet the compact disc coaster according to the present invention serves an important need which has so far gone unmet.

BRIEF DESCRIPTION OF THE DRAWINGS

FIG. 2 is a cross-sectional view of the compact disc of FIG. 1.

FIG. 3 is a plan view of a second compact disc coaster in accordance with the present invention.

DETAILED DESCRIPTION

Figure 1:
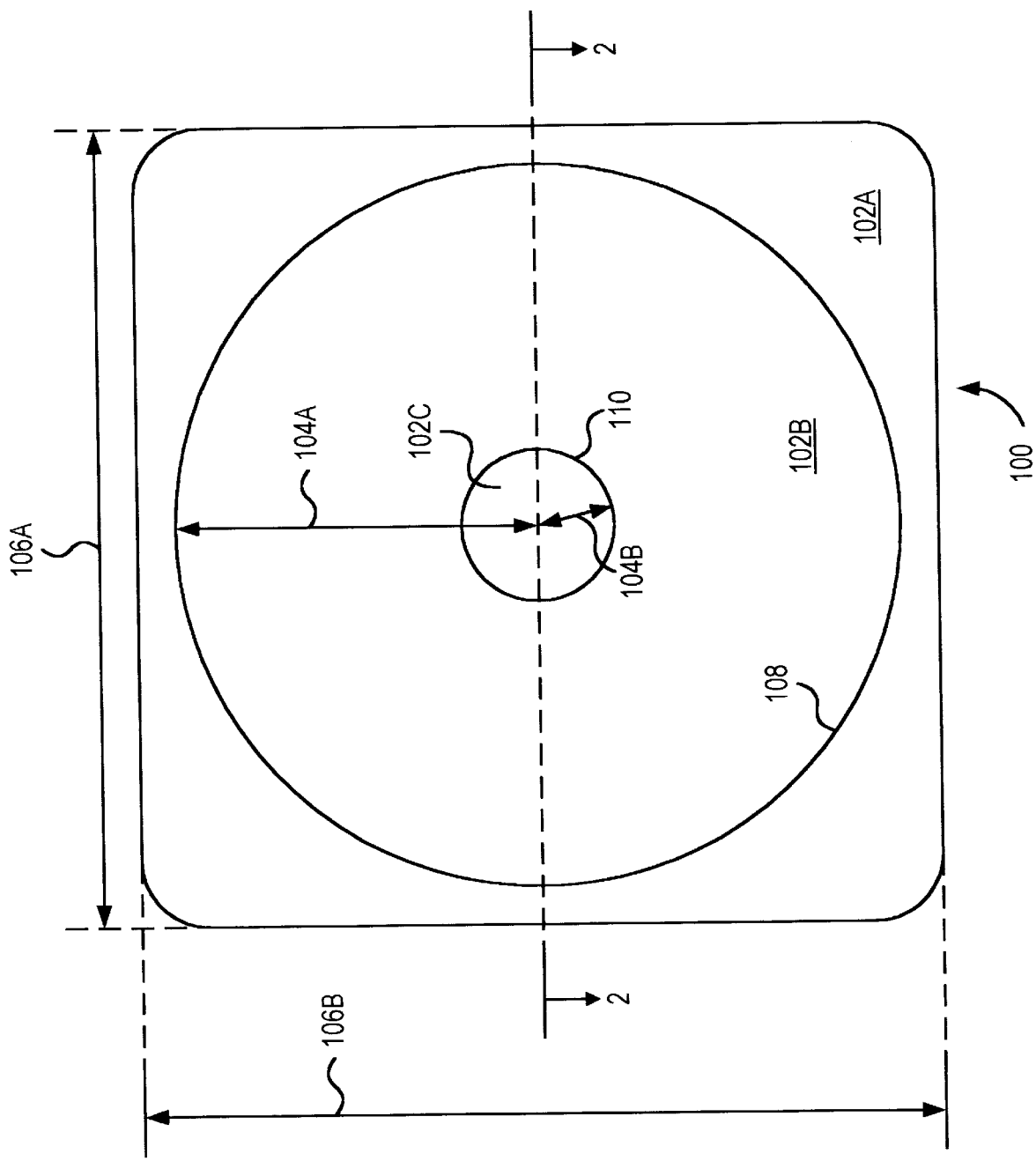
FIG. 1 is a plan view of a compact disc coaster in accordance with the present invention.

In accordance with the present invention, a compact disc coaster 100 (FIG. 1) includes a raised portion 102A and a recessed portion 102B which are generally adapted to receive a compact disc. A hole 102C in recessed portion 102B allows for easy removal of a compact disc from compact disc coaster 100 in a manner described more completely below. Compact disc coaster 100 includes a surface material 202A–B (FIG. 2) which is soft and which therefore does not scratch an underside of a compact disc (not shown) placed in recessed portion 102B (FIG. 1) of compact disc coaster 100. Since the compact disc is placed directly on recessed portion 102B, the underside of the compact disc is not slid along any surface of compact disc coaster 100. Accordingly, the likelihood that the underside of the compact disc is scratched when placed on compact disc coaster 100 is significantly less than the likelihood that the underside is scratched when the compact disc is placed in a compact disc envelope of a compact disc portfolio. However, since raised portion 102A is covered with surface material 202A (FIG. 2), inadvertent contact between the underside of a compact disc and raised portion 102A does not result in scratches in or damage to the underside of the compact disc.

Raised portion 102A has an inner edge 108 which is generally the size and shape of the outer edge of a compact disc. As a result, recessed portion 102B is adapted to receive a compact disc. For example, inner edge 108 is generally circular with a radius 104A of approximately two and three-eighths inches. Hole 102C has an outer edge 110 which is generally the size and shape of a center hole of a compact disc. Accordingly, a user can insert a finger into hole 102C through the center hole of a compact disc (not shown) resting in recessed portion 102B to thereby lift the compact disc from compact disc coaster 100. Thus, the design of compact disc coaster permits easy removal of a compact disc from compact disc coaster 100. Compact disc coaster 100 has an overall width 106A and an overall length 106B, both of which are approximately five and one-quarter inches in one embodiment.

FIG. 2 shows compact disc coaster 100 in cross-sectional view. Compact disc coaster 100 includes a bottom layer 206 which is a relatively high-friction layer. As a result, compact disc coaster 100 typically remains in place when placed on a sloped surface and generally does not slide along the sloped surface event in response to substantial movement of the sloped surface. For example, compact discs are frequently laid on sloped surfaces such as closed three-ring binders which lie on a desk or table. Movement of such sloped surfaces can cause a compact disc to slide along the slope surface and to fall to the floor or on top of other objects. Since bottom layer 206 is a relatively high-friction layer, compact disc coaster 100 resists sliding along sloped surfaces even in response to movement of such a sloped surface. Bottom layer 206 of compact disc coaster 100 has a thickness 208C of approximately one-sixteenth of an inch.

Compact disc coaster 100 includes a middle layer 204 in which the shapes of raised portion 102A, recessed portion 102B, and hole 102C are formed. Middle layer 204 has a thickness 208B of approximately one-sixteenth of an inch in area corresponding to recessed portion 102B. Middle layer 204 has a thickness 208D of approximately one-eighth of an inch in areas corresponding to raised portion 102A. Therefore, raised portion 102A has a height 208A of approximately one-sixteenth of an inch relative to recessed portion 102B. The thickness of a compact disc is typically less than one-sixteenth of an inch. Accordingly, another compact disc coaster which is generally of the construction of compact disc coaster 100 can be stacked on top of compact disc coaster 100 while compact disc coaster 100 holds a compact disc in recessed portion 102B.

In one embodiment, bottom layer 206 is formed of closed-cell sponge rubber while middle layer 204 is formed of open-cell sponge rubber, and bottom layer 206 and middle layer 204 are glued together with an adhesive. In another embodiment, bottom layer 206 and middle layer 204 are formed of one integral piece of closed-cell sponge rubber. It is observed that open-cell sponge rubber is generally higher in friction and structurally less rigid than closed-cell sponge rubber. Accordingly, in another embodiment, bottom layer 206 is formed of open-cell sponge rubber to provide a relatively high-friction bottom surface, and middle layer 204 is formed of open-cell sponge rubber to provide structural strength to compact disc coaster 100 such that compact disc coaster can be lifted by a corner without bending to drop a compact disc resting in recessed portion 102B.

Compact disc coaster 100 includes a top layer 202A–B of a soft, non-scratching material such as velvet or polyester. Top layer 202A is glued to raised portion 102A of middle layer 204 with an adhesive. Similarly, top layer 202A is glued to recessed portion 102B of middle layer 204 with an adhesive. Inner edge 108 of middle layer 204 is exposed to provide a relatively high-friction surface which serves to hold a compact disc resting in recessed portion 102B in place. A compact disc resting in recessed portion 102B has an outer edge which is in close proximity to inner edge 108. Accordingly, friction between the outer edge of such a compact disc and inner edge 108 reduces substantially the likelihood that sharp movement of compact disc coaster 100, e.g., as a result of bumping or dropping compact disc coaster 100, will dislodge such a compact disc resting in recessed portion 102B.

FIG. 3 shows a second compact disc coaster 300 in accordance with the present invention. Compact disc coaster 300 includes two recessed portions 302B and 302C, each of which is adapted to receive a compact disc generally in the manner described above with respect to recessed portion 102B (FIG. 1). Accordingly, compact disc coaster 300 (FIG. 3) can hold two compact discs simultaneously.

Figure 4:
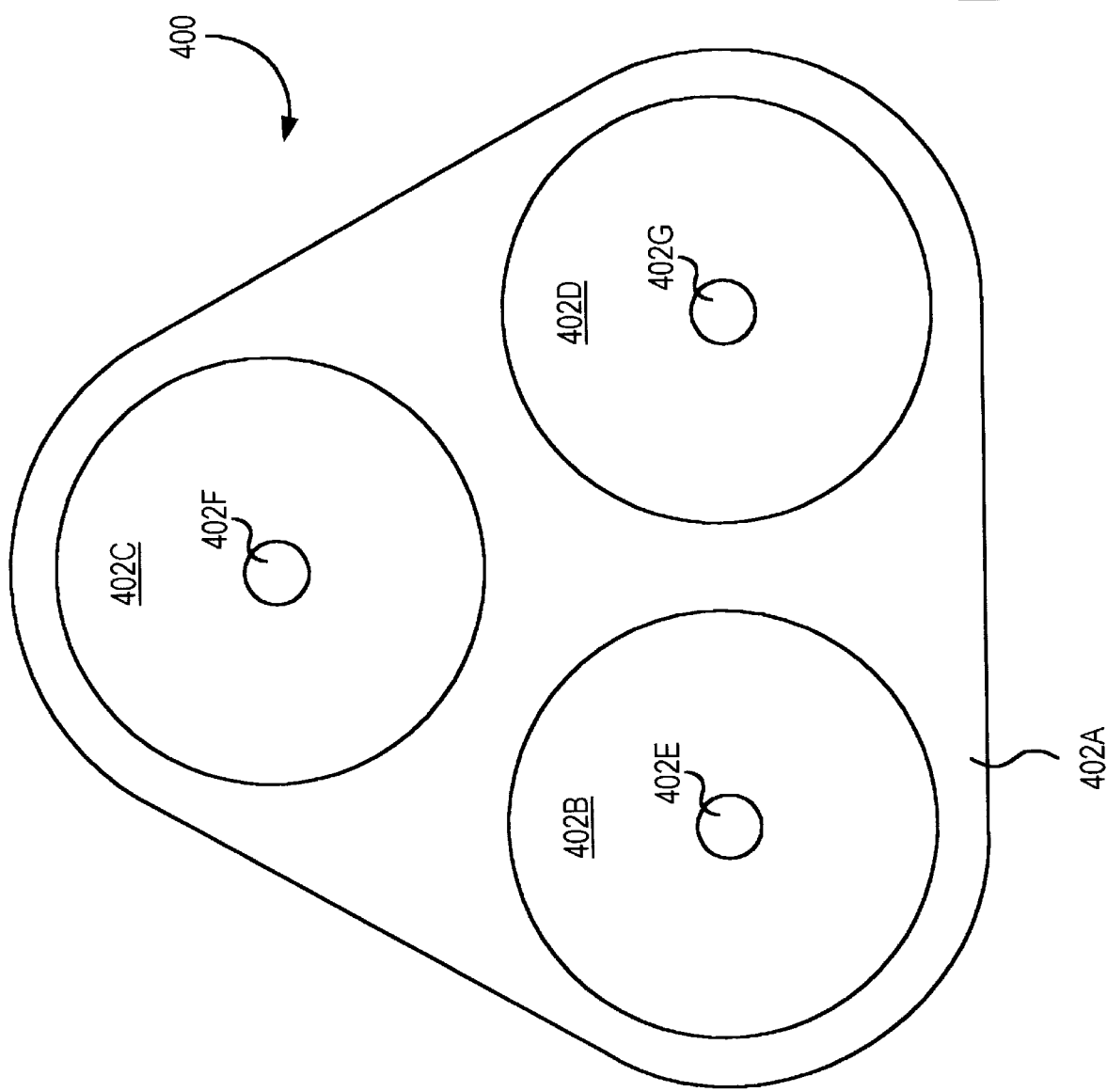
FIG. 4 is a plan view of a third compact disc coaster in accordance with the present invention.

FIG. 4 shows a third compact disc coaster 400 in accordance with the present invention. Compact disc coaster 400 includes three recessed portions 402B, 402C, and 402D, each of which is adapted to receive a compact disc generally in the manner described above with respect to recessed portion 102B (FIG. 1). Accordingly, compact disc coaster 400 (FIG. 4) can hold two compact discs simultaneously.

Figure 5:
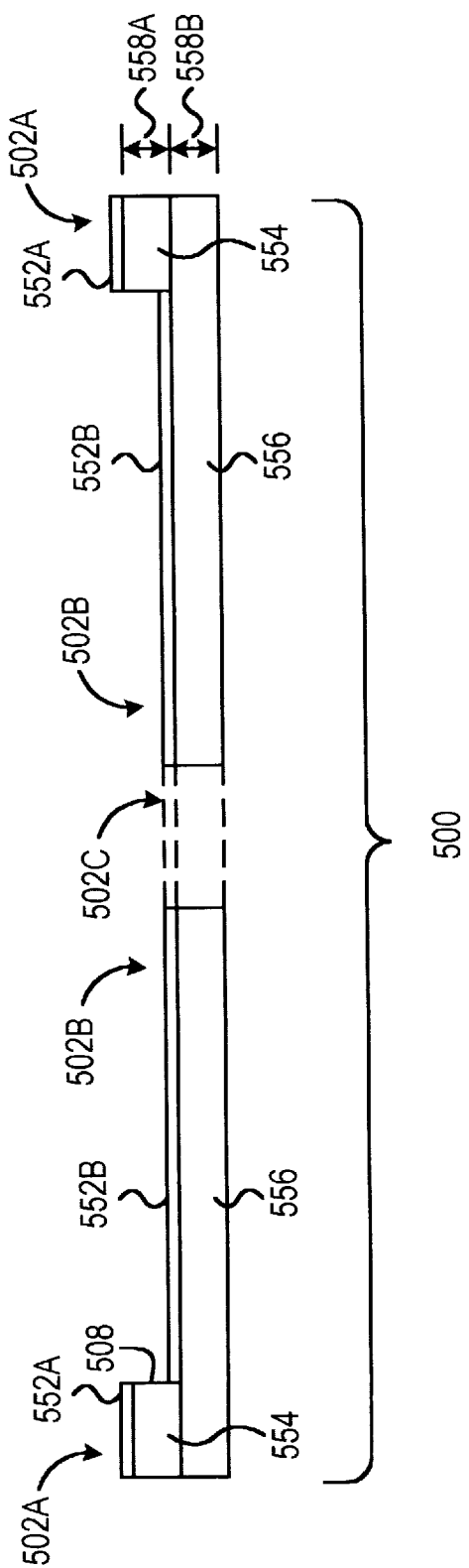
FIG. 5 is a cross-sectional view of a fourth compact disc coaster in accordance with the present invention.

FIG. 5 is a cross sectional view of compact disc coaster 500 which is an alternative embodiment of a compact disc coaster in accordance with the present invention. Compact disc coaster 500 is directly analogous to compact disc coaster 100 (FIG. 1) except as described below. Compact disc coaster 500 has a bottom layer 556 which is generally the shape and size of bottom layer 206 (FIG. 2) of compact disc coaster 100. Bottom layer 556 (FIG. 5) is open-cell sponge rubber and forms a relatively high-friction bottom surface of compact disc coaster 500. Compact disc coaster 500 includes a middle layer 554 which is cut in the shape of a raised portion 502A and which is glued to bottom layer 556 to form raised portion 502A and a recessed portion 502B. Raised portion 502A and recessed portion 502B are directly analogous to raised portion 102A and recessed portion 102B described above. Middle layer 554 is closed-cell sponge rubber to enhance the structural strength of compact disc coaster 500. Top layer 552B is glued to bottom layer 556 in recessed portion 502B to provide a substantially non-scratching surface on which the underside of a compact disc (not shown) can rest. Top layer 552A is glued to middle layer 554 on raised portion 502A to protect the underside of a compact disc (not shown) from damage or scratches resulting from inadvertent contact with raised portion 502A during placement of the compact disc into recessed portion 502B.

In one embodiment, top layer 552B is velvet and has a sufficiently high pile that small particles fall into the pile of top layer 552B which holds a compact disc above such particles. In such an embodiment, some small particles can fall on to recessed portion 502B without presenting a hazard of scratching or damage to compact discs placed in recessed portion 502B.

Middle layer 554 has a thickness 558A which is sufficient to allow a compact disc to rest in recessed portion 502B and to be held in place by an inner edge 508 of middle layer 554. Inner edge 508 holds a compact disc in place in a manner which is directly analogous to inner edge 108 as described above in greater detail.

The above description is illustrative only and is not limiting. The present invention is limited only by the claims which follow.

What is claimed is:

1. A data storage medium coaster for storing a data storage medium having a data access surface, the data storage medium coaster comprising:

an upper surface of a substantially non-scratching material so as to avoid substantial damage to the data access surface when in contact with the non-scratching material and which is adapted to receive the data storage medium; and a relatively high-friction bottom surface which is laminated with the upper surface;

wherein the relatively high-friction bottom surface is a bottom surface of an integral structure member to which the substantially non-scratching material is directly adhered.

* * * * *